United States Patent [19]

[11] 4,144,523

Kaplit

[45] Mar. 13, 1979

[54] DIGITAL KEY SYSTEM

[75] Inventor: Michael Kaplit, Birmingham, Mich.

[73] Assignee: General Motors Corporation, Detroit, Mich.

[21] Appl. No.: 854,250

[22] Filed: Nov. 23, 1977

[51] Int. Cl.$^2$ .......................... E05B 49/00; H04Q 3/00; E05H 47/00

[52] U.S. Cl. ......................... 340/149 R; 340/147 MD; 361/172; 365/96

[58] Field of Search ....... 340/149 R, 149 A, 147 MD; 361/171, 172, 190; 365/96

[56] References Cited

U.S. PATENT DOCUMENTS

| | | | |
|---|---|---|---|
| 3,761,892 | 9/1973 | Bosnyak et al. | 340/149 R |
| 3,821,704 | 6/1974 | Sabsay | 340/149 A |
| 3,846,756 | 11/1974 | Schmitz | 340/149 A |

*Primary Examiner*—Donald J. Yusko
*Attorney, Agent, or Firm*—Albert F. Duke

[57] ABSTRACT

A digital key system is disclosed which includes a programmable read only memory which is automatically programmed with the code for unlocking the system during initial removal of the key from the lock.

3 Claims, 3 Drawing Figures

DIGITAL KEY SYSTEM

This invention relates to digital key systems and, more particularly, to a digital key system incorporating circuitry for automatically and permanently loading a key code in the memory of the system.

Digital key systems are known in which the key portion of the system is provided with a digital code which is compared with a code stored in the memory of the lock portion of the system so as to produce an unlock output only when the key and lock codes match. One such system employing a key provided with an array of holes forming a digital code and a lock including an optical reader is disclosed in the patent to Miller U.S. Pat. No. 3,688,269.

One of the problems associated with the prior art systems is the record keeping necessary to insure matching the proper key with the proper lock memory where these components are manufactured at different locations and shipped to a common assembly location. This is likely to occur where the system is to be installed in an automobile. This problem is overcome in the present invention by automatically programming the lock memory during initial use of the key. More specifically, in accordance with the present invention, the lock includes circuitry responsive to the digital pulse train generated upon removal of the key from the lock for programming or writing the code in the lock memory. The lock also includes circuitry for disabling the programming circuitry after entry of the code into the lock memory. Thereafter the code entered in memory is compared with the code generated by insertion of the key in the lock to produce an unlock output when the codes match.

A more complete understanding of the present invention may be had from the following detailed description in which.

Figure 1:
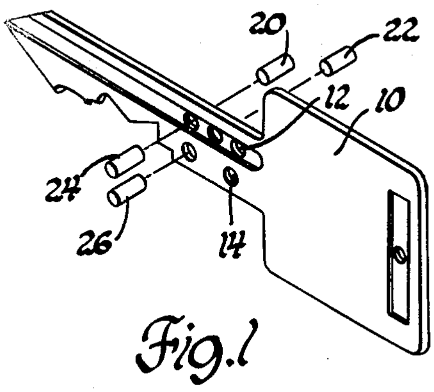
FIG. 1 shows the key used in a preferred embodiment of the invention.
Figure 2:
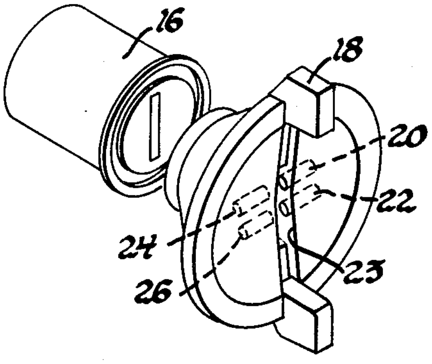
FIG. 2 shows a conventional mechanical lock mechanism modified to incorporate a light source and a reader-sender.

Referring now to the drawing and initially to FIG. 1, a conventional motor vehicle ignition key generally designated 10 has been modified to include two rows of holes 12 and 14. The top row of holes 12 control the entry of the digital code contained in the lower set of holes 14. As shown in FIG. 2, the conventional motor vehicle ignition lock 16 has been modified by incorporating within the knob 18 a pair of light-emitting diodes 20 and 22 each of which form a light source on one side of an opening 23 for receiving the key 10. On the other side of the opening 23 phototransistors 24 and 26 detect the presence or absence of light passing through the sets of holes 12 and 14. When the key 10 is inserted in the lock 16 the upper row of holes cause a clock pulse train to be produced at the output of the phototransistor 24. The upper row of holes 12 may hereinafter be referred to as clock holes. As the lower row of holes 14 passes between the light-emitting diode 22 and the phototransistor 26 a binary pulse train is generated at the output of the phototransistor 26 corresponding to the digital code. The lower row of holes 14 may hereinafter be referred to as code holes. The absence or presence of a hole below each clock hole corresponds to a 0 or a 1, respectively, and thus creates the binary code. The code holes 14 are larger than the clock holes 12 so that the optical reader-sender formed by the diodes 20 and 22 and the phototransistors 24 and 26 establishes a 0 or a 1 state prior to its corresponding clock pulse, as the key 10 is inserted in the lock 16. Only eight different codes would be provided by the arrangement shown in FIG. 1, however, the present ignition key could accommodate up to twelve code holes providing 4,096 combinations. Moreover, since both the current mechanical ignition lock and the digital key system have to be satisfied, the total number of combinations could be quite large.

Figure 3:
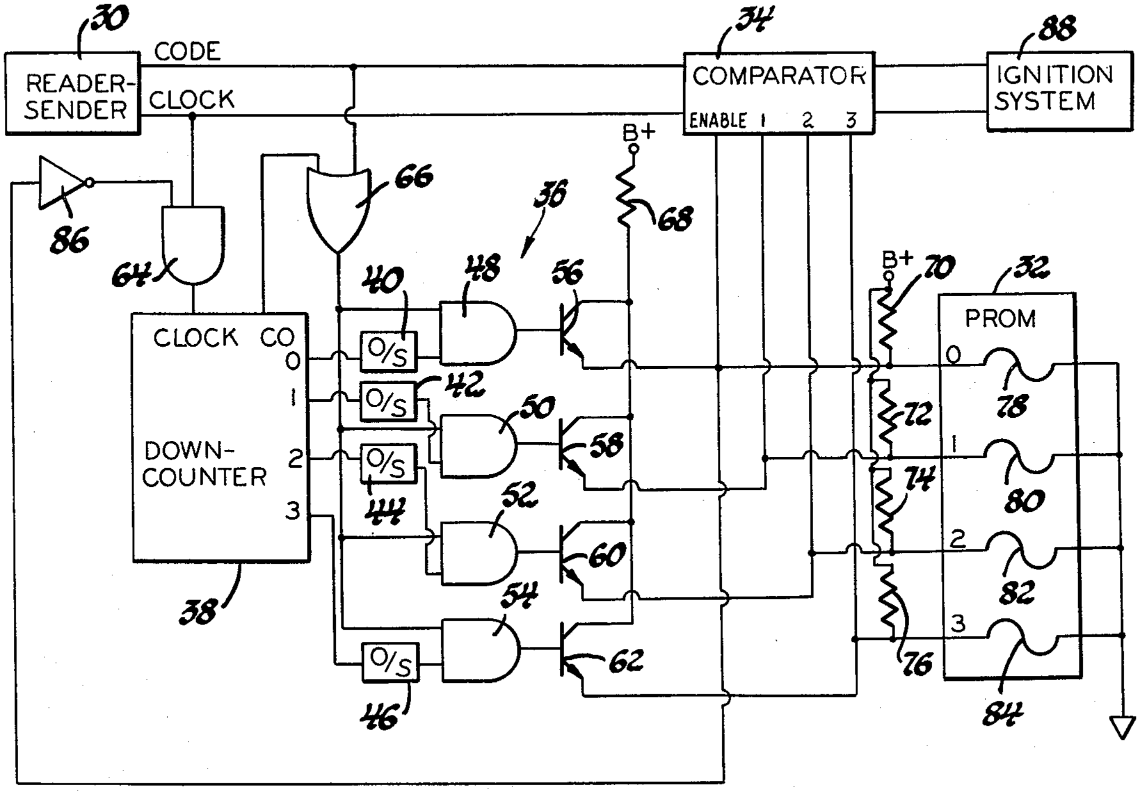
FIG. 3 is a block diagram of the electronic apparatus employed in the present invention.

Referring now to FIG. 3, the reader-sender 30 includes the diodes 20, 22 and phototransistors 24, 26 as well as appropriate conditioning circuitry such as Schmidt triggers for improving the rise and fall time of the pulses generated by insertion or removal of the key 10 from the lock 16. The lock circuitry further includes a programmable read only memory (PROM) 32 and a comparator 34. The comparator 34 may include a shift register for receiving and storing the code generated by the reader-sender 30, and exclusive OR logic for comparing the code loaded in the shift register with the outputs designated 1, 2 and 3 of the PROM 32.

The proper code to be stored in the PROM 32 is generated by means of programmer circuitry generally designated 36. The programmer circuitry 36 comprises a downcounter 38, one shot multivibrators 40–46, AND gates 48–54 and power transistors 56–62. Clock pulses are applied from the reader-sender 30 through an AND gate 64 to the clock input of the downcounter 38. The code output of the reader-sender 30 is applied through an OR gate 66 to one input of the gates 48–54. The other inputs to gates 48–54 is from the multivibrators 40–46, respectively, connected with the 0–3 outputs of the downcounter 38. The multivibrators 40–46 produce a pulse which enables the gates 48–54 for a short duration interval. The outputs of gates 48–54 are connected with the base electrodes of the transistors 56–62, respectively. The transistors 56–62 each have their collector electrodes connected to B+ through a current limiting resistor 68 and their emitter electrodes connected with the 0–3 inputs of PROM 32. The inputs to the PROM 32 are also connected to B+ through high impedance pull-up resistors 70–76. The PROM 32 is illustrated as comprising a plurality of fusible links 78–84 having one side connected to ground. If any one of the transistors 56–62 is turned on the corresponding one of the links 78–84 is "blown" so that the corresponding one of the inputs to the comparator 34 is pulled-up to a logic 1. If the fusible link remains intact, the input to the comparator 34 is a logic 0 due to the ground connection with the PROM 32.

It will be assumed in the following discussion that the key 10 and lock 16 arrive from one source with the key already inserted in the lock and that the circuitry including a virgin PROM 32 arrive from a second source and that the vehicle is far enough along the production line so that the lock with the digital key fully inserted and the electronics and the vehicle battery are installed and connected. The virgin PROM 32 is programmed by removal of the key 10. Thus, the code is generated in the reverse order to that which would occur when the key is inserted. As the key 10 is removed, the first clock pulse generated enables the #3 output of downcounter 38 so that gate 54 is enabled during the interval of the multivibrator 46. The first data bit is therefore written into the #3 location of the PROM 32 under the control of downcounter 38, multivibrator 46, gate 54 and transistor 62. If the first data bit is a logic 1, the transistor 62 will be turned on to blow the link 84. Thereafter a logic 1 will be provided at the #3 input of comparator 34. If the first data bit is a logic 0, the transistor 62 will not be turned on and the link 84 will remain intact so that a logic 0 is applied to the #3 input of comparator 34. The clock pulse associated with the second data bit decrements the counter 38 to thereby enable the gate 52 so that the link 82 is blown if a logic 1 data bit is encountered or remains intact if a logic 0 data bit is present. Similarly, the last bit is written into the #1 position of the PROM 32. As the key is completely removed from the lock, the phototransistors 24 and 26 are unblocked and a final clock pulse and a final logic 1 data bit is generated. This causes the counter 38 to decrement to the 0 position enabling the gate 48. The logic 1 turns on the transistor 56 and blows the link 78 so that a logic 1 is applied to the enable input of the comparator 34 and the gate 64 is disabled through the inverter 86. Thus, the initial withdrawal of the key 10 from the lock 16 programs the PROM 32 such that if the same key is reinserted the code generated will be the same as that stored in locations 1–3 of the PROM 32 and the comparator 34 will produce an output which is used to enable the ignition system 88 of the vehicle. Any mismatch between the code generated by the reader-sender 30 and that stored in the PROM 32 will cause the comparator 34 to produce a signal which prevents operation of the vehicle by disabling the ignition system 88. The ignition system 46 may also include time delay circuitry responsive to a disable signal which prevents operation of the ignition system for a predetermined interval of time to prevent attempted defeating of the system by scanning the various possible codes with an electronic device. Preferably the circuitry shown in FIG. 3, excluding the light-emitting diodes and photo-transistors is formed on a single integrated circuit and located remote from the ignition lock 16, for example, in the starter motor or distributor.

Having thus described my invention what I claim is:

1. In a security system including a key having a digital code, key reader means for receiving said key and for generating a digital signal as a result of movement of said key relative to said key reader, and comparator means for establishing an enable condition when the code signal generated by insertion of said key in said key reader matches a stored code, the improvement comprising programmable memory means for supplying said stored code to said comparator means, write circuit means for loading the code in said memory, gate means connecting said write circuit means with said code reader, said write circuit means causing the code to be loaded in said memory in response to the code signal generated upon withdrawal of said key from said code reader, said gate means normally passing said code signal to said write circuit means but adapted to inhibit passage of said code signal upon the completion of the loading of said code in said memory.

2. A digital key system including a key provided with a digital code, code reader means for receiving said key and for generating a data pulse train and a clock pulse train in response to movement of said key relative thereto, a programmable memory, write circuitry responsive to said code pulse train and said clock pulse train for programming said memory with the code formed on said key, gate means responsive to completion of the programming of the code in said memory for disabling said write circuitry to prevent subsequent programming of said memory, comparator means for comparing the code in said memory with the code generated by insertion of said key in said code reader, and means for disabling the operation of a load device in the event of a mismatch between the code on said key and the code in said memory.

3. A security system including a key having a digital code, key reader means for receiving said key input generating a data pulse train and a clock pulse train in response to movement of said key relative to said reader means, a programmable read only memory, programming circuitry responsive to the data pulse train and clock pulse train generated during withdrawal of said key from said reader means for programming said memory, said key reader means generating a final clock pulse and a final data pulse upon complete withdrawal of said key from said reader means, comparator means adapted to be enabled in response to said final clock pulse and data pulse and for comparing the code of said memory with the code generated by insertion of said key in said code reader, gate means for disabling said write circuit means in response to said final clock pulse and said final data pulse, and means for disabling the operation of a load device in the event of a mismatch between the code on said key and the code in said memory.

* * * * *